United States Patent [19]
Pollitt et al.

[11] 4,236,755
[45] Dec. 2, 1980

[54] SHOULDER HEIGHT ADJUSTER FOR SEAT BELT SYSTEMS

[75] Inventors: John M. Pollitt, Stranraer, Scotland; Frederick Nicod, Carlisle, England

[73] Assignee: Kangol Magnet Limited, Carlisle, England

[21] Appl. No.: 14,027

[22] Filed: Feb. 22, 1979

[30] Foreign Application Priority Data

Feb. 22, 1978 [GB] United Kingdom ............... 7086/78

[51] Int. Cl.³ .................. A47C 31/00; B60R 35/00
[52] U.S. Cl. .................................. 297/483; 297/468
[58] Field of Search ............ 297/468, 473, 479, 483; 280/808, 801

[56] References Cited

U.S. PATENT DOCUMENTS

| | | | |
|---|---|---|---|
| 3,860,261 | 1/1975 | Takada | 297/483 X |
| 3,866,975 | 2/1975 | Fricko | 297/479 |
| 4,009,510 | 3/1977 | Lindblad | 297/479 X |

FOREIGN PATENT DOCUMENTS

| | | | |
|---|---|---|---|
| 580203 | 7/1959 | Canada | 297/473 |
| 1464841 | 7/1966 | France | 297/473 |
| 1239709 | 7/1971 | United Kingdom . | |
| 1426584 | 3/1976 | United Kingdom . | |
| 1497773 | 1/1978 | United Kingdom . | |

*Primary Examiner*—James T. McCall
*Attorney, Agent, or Firm*—Young & Thompson

[57] ABSTRACT

In a vehicle seat belt system having a shoulder or diagonal belt or belt portion, an auxiliary strap is positioned to extend generally upright on the front of the back portion of the seat, on the side from which the belt or belt portion extends downwardly. A connector for the belt or belt portion can be moved to a selected position along the strap to determine the effective position from which the upper end of the belt or belt portion extends. The auxiliary strap can be connected to the vehicle anchorages for the seat belt system where this is a three point or lap and diagonal system.

15 Claims, 4 Drawing Figures

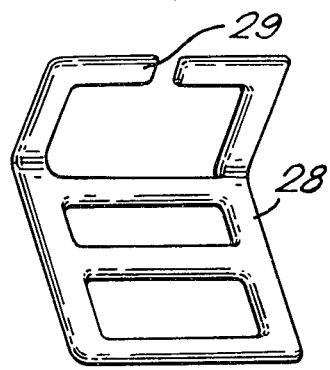
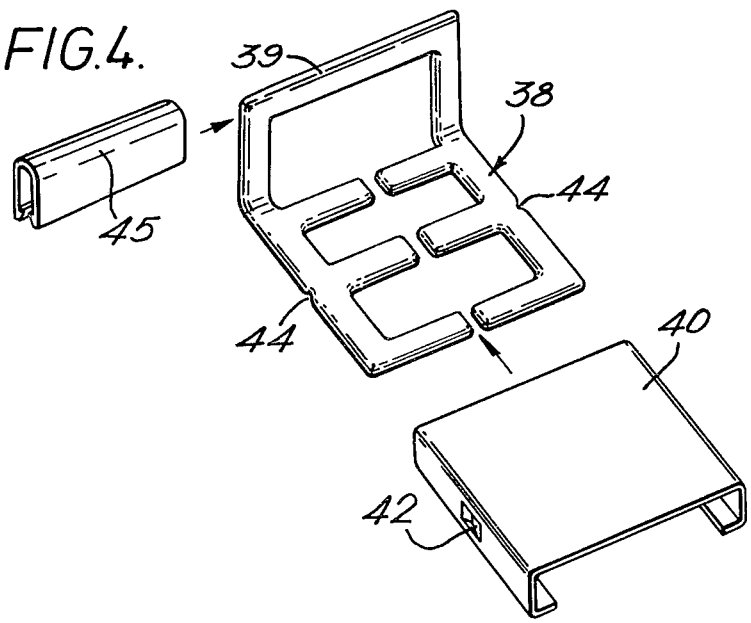

SHOULDER HEIGHT ADJUSTER FOR SEAT BELT SYSTEMS

The invention relates to vehicle seat belt arrangements and in particular to vehicle seat belt systems having a diagonal belt element.

Many seat belt systems include a belt element arranged to extend in use diagonally across the torso of the occupant of a seat with which the system is associated. Such a diagonal or shoulder belt element is frequently continued from a securement position at its lower end, which position may be constituted by a manually releasable buckle, across the users lap, to another securement position or anchorage on the other side so that the system constitutes a three-point or lap and diagonal system.

The diagonal belt element normally extends downwardly from a fixed position constituted by an anchorage or securement position, or by a retractor, for example an emergency locking retractor, in which the unused length of its upper end is stored. This fixed position has to be chosen so as to appropriate to the tallest persons within the normal range and is consequently located above the shoulders of shorter persons, or children of sizes intermediate between those of infants and adults, by an inconvenient amount.

An earlier proposal for dealing with this problem is disclosed in GB No. 1 367 248. According to this proposal, a seat belt support of metal plate construction is slidable in a vertical metal channel mounting secured to the vehicle door frame, the support being spring urged to engage rivets projecting therefrom into slots provided within the mounting, to releasably secure the support at a selected height. The belt can be directly secured to the support in a static system or slidably anchored in the support where the belt comes from an inertia reel. This proposal has the disadvantage of requiring a considerable structure for its realization so that it cannot in practice be added to an existing vehicle. Moreover, the vertical position of the support cannot be infinitely adjusted but must be selected from preset possibilities. The securement of the mounting on the vehicle door severely limits the seat belt configurations with which it can be employed and there is no possibility of moving the support backwards or forwards in the vehicle to accommodate corresponding adjustment of the associated vehicle seat.

It is thus an object of the present invention to provide for the adjustment of the upper connection position of a diagonal belt element of a seat belt system by means which are simple to manufacture and to use and which can readily be added to a vehicle to which the system is already fitted.

It is also an object of the present invention to provide an adjustment device for the effective shoulder position of a diagonal seat belt element in a vehicle seat belt system which can be mounted in the vehicle by use of anchorage positions for mounting the seat belt system.

It is a further object of the invention to provide such a device which can be comprised of components employed in the associated seat belt system.

The invention accordingly provides guide or adjustment means for a shoulder or diagonal belt or the belt portion of a vehicle seat belt system, the guide means being adapted to be mounted in the vehicle as an addition to the system to be connected to the belt or belt portion at a position in the region of the users shoulder.

The diagonal belt portion can preferably be connected to the adjustment means selectively, and at a selected position thereon. The adjuster means is thus conveniently constituted at a range of plurality of connection positions fixedly located on the front surface of the back portion of the users seat, towards the top thereof on the side from which the belt position downwardly extends.

The invention will be readily understood from the following illustrative description of preferred embodiments thereof and from the accompanying drawings, in which:

FIG. 3 is a perspective view of the connector of FIG. 2; and

FIG. 4 is an exploded perspective view of a modified form of the connector of FIGS. 1 and 2.

Figure 1:
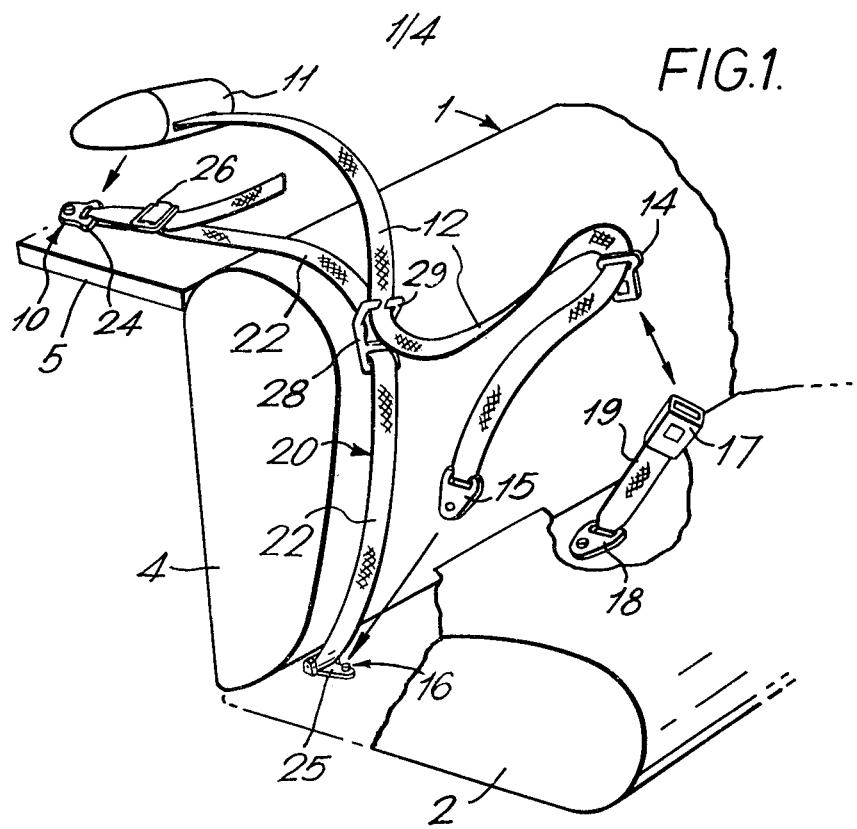
FIG. 1 is an exploded perspective view of a seat belt system including a shoulder height adjustment device in accordance with the invention, fitted to a vehicle seat of which parts are shown broken away.

FIG. 1 somewhat schematically shows the right-hand side of the rear seating 1 of a passenger vehicle, typically a private motor vehicle. The seating comprises a seat portion 2 and a squab or back portion 4. For use by an occupant of the right-hand side of the illustrated seating there is provided a 3-point safety belt system comprising a retractor 11 incorporating a belt and/or vehicle sensitive locking mechanism, secured to a first anchorage 10 to the rear of the seating, conveniently as shown, on a parcel shelf 5 behind it. Where the vehicle is an estate type vehicle without the parcel shelf 5, the strap 22 can extend over the back of the seat and downwardly to a retractor secured to a suitably positioned anchorage for example on the seat back or the vehicle floor.

A belt 12 can be withdrawn for use from a retractor 11 against the pull of a rewind spring within the retractor. The belt 12 extends in use from the retractor 11 diagonally downwards to a tongue 14 of a releasable two-part buckle and through an aperture in the tongue to an anchor bracket 15 to which the end of the belt 12 is secured. The bracket 15 is permanently secured to a second anchorage 16, but which is shown spaced from it for clarity. The anchorage 16 is at the right-hand side of the seating so as to be to the right of a user of the seat belt system. To the left of the user, the tongue 14 is releasably connected in use with a socket member 17 of the buckle which is secured to a third anchorage 18 by means of a short length of belt 19 or by a bracket or non-resilient wire extending between the seat portions 2 and 3. The belt in use thus has a diagonal or shoulder portion between the retractor 11 and the tongue 14, and a lap or pelvis portion between the tongue 14 and the anchor bracket 15.

When out of use, the tongue 14 is disconnected from the buckle socket member 17 and the retractor 11 pulls the belt 12 so that it extends directly between the retractor and the anchorage 16. An occupant of the seating will place himself between the belt 12 and the buckle member 17 and will move the tongue 14 across him to assemble it with the member 17 so that the belt 12 forms the lap and diagonal portions.

It will be seen that the upper end of the diagonal portion of the belt 12 is defined by the position of the retractor 11. This is appropriate to normal adult shoulder heights but not to lesser shoulder heights for example those of children. In accordance with the invention therefore means is provided whereby the effective position of the upper end of the shoulder portion can be selectively adjusted. In FIG. 1, this means is constituted by an adjustment device 20 comprising a strap 22 which may but need not be of the same material as the belt 12. At its ends, the strap 22 has anchor brackets 24, 25, which can be of the same type as is used in the seat belt system, by which the ends are secured to the retractor anchorage 10 and the second anchorage 16 respectively.

Although it is convenient to use the anchorages already provided for the seat belt system either or both ends of the strap 22 can be secured to other positions according to the vehicle structure. The strap 22 is required to be tight over the seat back and a length adjusting means 26, which can be of any suitable kind, is provided in the strap adjacent the upper bracket 24. This also permits the strap to be adapted to different vehicles and/or connection positions.

Figure 2:
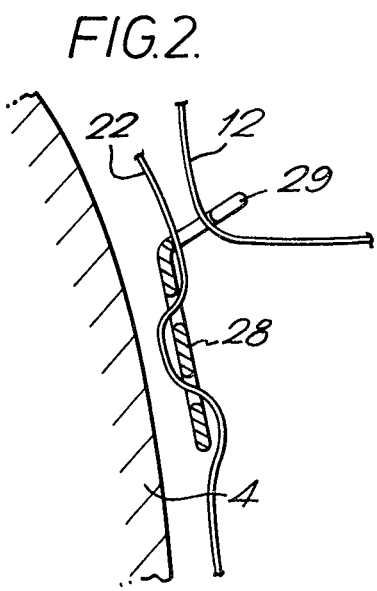
FIG. 2 is a fragmentary sectional side view on a larger scale of a connector included in the system of FIG. 1.

A connector 28 in the form of a four-bar link is threaded on the strap 22 as shown in FIG. 2 between the length adjusting means 26 and the lower bracket 25. One bar 29 of the connector 28, which is split, is out the plane of the other three and is placed above the other three so as to be spaced forwardly of the seat squab portion 4. The strap 22 is received over the outer two of the co-planar bars and under the bar between them.

In use, the connector 28 is moved along the strap 22 until it is at a suitable height just above the shoulder of the occupant. The diagonal portion of the seat belt 12 is then threaded beneath the split bar 29 as shown in FIGS. 1 and 2. The bar 29 then provides the position from which the effective length of the diagonal portion of the seat belt 12 extends, this position being selectively adjustable along the length of the strap 22 to suit the occupant. The position can be so far down the strap 22 if preferred that the belt 12 functions as a lap belt rather than a shoulder belt. The shoulder height adjustment means can be taken out of use simply by unthreading the belt 12 from the connector 28 and sliding this along the strap 22 upwardly for example over the seat back, after slackening the length adjusting means 26 if necessary.

The connector 28 can be replaced by connectors of different form for example a link having telescopic bars or pivoted closing clips. FIG. 4 shows a modified connector 38 which avoids a discontinuity in the bar 29 of the connector 28.

The connector 38 is again a four bar link of the same general form as the connector 28 but the outwardly extended bar is unbroken, the remaining three being split. The connector 38 can thus be completely removed from the strap 22 when the seat belt system is to be used without the aid of the shoulder height adjustment means of the invention.

A cover 40 of metal or plastics material can be received over the three co-planar bars of connector 38 and releasably secured in place by inwardly struck tongues 42 which engage in recesses 44 in the connector side edges. A releasable cover 45 conveniently of plastics material, shown in FIG. 4, can be applied over the bar 39. Such a cover or covers can be applied also to the connector 28.

Although the adjustment device described is suitable for addition to vehicles with existing seat belt systems, it will be evidetnt that adjustment devices of the invention can be incorporated as original equipment or included in seat belt systems to be fitted either to new or to existing vehicles. The seat belt system in or with which an adjustment device of the invention is employed can be of any kind comprising or including a diagonal or shoulder belt or belt portion.

It will be evident that the embodiments specifically described herein may be modified by those skilled in the art on the basis of the present disclosure without departing from the present inventive concepts. The present invention is thus to be regarded as embracing each and every novel feature and combination of novel features herein disclosed and as limited solely by the spirit and scope of the appended claims.

We claim:

1. A safety belt system for restraining an occupant in a vehicle seat, the system comprising a shoulder belt extending in use diagonally across the front of the occupant from an upper first position above the user's shoulder at one side of the seat to a second lower position at the other side of the seat, elongate means, means fixing said elongate means in position so as to be independent of said shoulder belt, and connector means carried by said elongate means and connectible with said shoulder belt at a position thereon between said first position and said shoulder.

2. The seat belt system of claim 1 wherein said connector means is selectively adjustable along said elongate means.

3. A vehicle comprising a seat and the seat belt system of claim 1 associated with said seat, wherein said seat belt system further comprises buckle means releasably connecting said shoulder belt to said vehicle at said second position, and a lap belt extending from said buckle means across the lap of the user to a third connection position at said one side of said seat, and wherein said fixing means connect said elongate member to said vehicle at said first and third connection positions.

4. A vehicle as claimed in claim 3 further comprising spring-loaded retractor means for said shoulder belt at said first position.

5. A vehicle as claimed in claim 3 wherein said elongate member extends generally upright over the back portion of said seat.

6. The seat belt system of claim 1 wherein said connector means comprises a link member adapted to receive said elongate means and said shoulder belt between the links thereof.

7. The seat belt system of claim 6 wherein said link member has at least one split link permitting the link member to be connected to and released from at least one of said elongate means and said shoulder belt.

8. The seat belt system of claim 6 wherein said link member comprises three substantially coplanar links and a fourth link spaced from the plane of said three links.

9. A safety belt system for restraining an occupant in a vehicle seat having a back portion, the system comprising a shoulder belt extending in use diagonally across the front of the occupant from an upper first position above the user's shoulder at one side of the seat to a second lower position at the other side of the seat, and means located on said back portion of said seat connectible with said shoulder belt at a selected one of a range of positions on said back portion.

10. The seat belt system of claim 9 wherein said means comprises strap means extending generally upright over said back portion, and connector means for connection with said shoulder belt and selectively slidable along said means.

11. The seat belt system of claim 10 further comprising means for selectively adjusting the length of said strap means.

12. The seat belt system of claim 10 wherein said connector means comprises a strap receiving means adapted to receive said strap means therethrough, whereby said strap receiving means lies against said seat back portion, and shoulder belt guide means for freely receiving said shoulder belt element therethrough, said shoulder belt receiving means being carried by said strap receiving means at a position spaced away from said seat back portion.

13. The seat belt system of claim 12 wherein said shoulder belt guide means comprises a split link permitting selective reception thereby and removal therefrom of said shoulder belt.

14. The seat belt system of claim 10 wherein said strap means and said shoulder belt are of like material.

15. The seat belt system of claim 10 further comprising fitting means at each end of said strap means, said fitting means being adapted for securement of said strap means at connection positions for said seat belt system.

* * * * *